US010200858B2

(12) United States Patent
Lalgudi Natarajan et al.

(10) Patent No.: US 10,200,858 B2
(45) Date of Patent: Feb. 5, 2019

(54) DISTRIBUTED MANAGEMENT SYSTEM FOR SECURITY OF REMOTE ASSETS

(71) Applicants: Rajaram Lalgudi Natarajan, Chennai (IN); Srikrishna Marur Varadharajan, Chennai (IN)

(72) Inventors: Rajaram Lalgudi Natarajan, Chennai (IN); Srikrishna Marur Varadharajan, Chennai (IN)

(*) Notice: Subject to any disclaimer, the term of this patent is extended or adjusted under 35 U.S.C. 154(b) by 0 days.

(21) Appl. No.: 15/182,634

(22) Filed: Jun. 15, 2016

(65) Prior Publication Data

US 2018/0020344 A1 Jan. 18, 2018
US 2018/0359632 A9 Dec. 13, 2018

(30) Foreign Application Priority Data

Aug. 3, 2015 (IN) .......................... 4016/CHE/2015

(51) Int. Cl.
*H04W 12/04* (2009.01)
*G07C 9/00* (2006.01)
*H04L 9/32* (2006.01)
*H04W 12/06* (2009.01)

(52) U.S. Cl.
CPC ........ *H04W 12/04* (2013.01); *G07C 9/00103* (2013.01); *G07C 9/00571* (2013.01); *G07C 9/00896* (2013.01); *H04L 9/32* (2013.01); *H04W 12/06* (2013.01); *G07C 9/00309* (2013.01)

(58) Field of Classification Search
CPC .. H04W 12/04; H04W 12/06; G07C 9/00103; G07C 9/00571; G07C 9/00896; H04L 9/32
See application file for complete search history.

(56) References Cited

U.S. PATENT DOCUMENTS

| | | | | |
|---|---|---|---|---|
| 7,346,331 B2* | 3/2008 | Taylor | ................ | G07C 9/00103 340/5.1 |
| 8,120,460 B1* | 2/2012 | Zhu | ......................... | B60R 25/24 340/5.1 |
| 8,896,416 B1* | 11/2014 | Lundy | ..................... | E05B 47/00 340/5.1 |
| 8,943,187 B1* | 1/2015 | Saylor | .................... | H04L 67/306 709/223 |
| 8,989,053 B1* | 3/2015 | Skaaksrud | ............ | H04W 12/06 370/255 |
| 9,057,210 B2* | 6/2015 | Dumas | ............... | G07C 9/00571 |
| 9,082,244 B2* | 7/2015 | Gerstenkorn | ...... | G07C 9/00896 |
| 9,141,090 B2* | 9/2015 | Kalous | ..................... | G05B 1/01 |
| 9,353,551 B2* | 5/2016 | Martinez | ............. | E05B 47/0001 |
| 9,396,598 B2* | 7/2016 | Daniel-Wayman | ......................... | G07C 9/00309 |
| 9,467,859 B2* | 10/2016 | Moss | .................... | H04W 12/08 |
| 9,478,084 B1* | 10/2016 | Robinson | ............ | G07C 9/00111 |

(Continued)

*Primary Examiner* — Brian E Miller
(74) *Attorney, Agent, or Firm* — Blank Rome LLP

(57) ABSTRACT

A Distributed management system for security of remote assets which provides security for widely distributed assets while at the same time providing great flexibility for a multiplicity of authorized persons without passcodes or personal keys to access multiple assets. The system has great flexibility by separating the lock and Key function and provides complete history of Key-Lock operations of the asset in real time scenario. The system gives a comprehensive solution to the static or mobile asset located at remote location to the owner.

9 Claims, 7 Drawing Sheets

(56) References Cited

U.S. PATENT DOCUMENTS

| | | | | |
|---|---|---|---|---|
| 9,531,694 | B2* | 12/2016 | Alt | H04L 63/061 |
| 9,600,949 | B2* | 3/2017 | Conrad | G07C 9/00571 |
| 9,691,207 | B2* | 6/2017 | Almomani | G07C 9/00309 |
| 9,728,022 | B2* | 8/2017 | Gengler | G07C 9/00174 |
| 9,806,689 | B2* | 10/2017 | Polak | H03G 3/301 |
| 2002/0180582 | A1* | 12/2002 | Nielsen | G07C 9/00103 |
| | | | | 340/5.6 |
| 2012/0280783 | A1* | 11/2012 | Gerhardt | G07C 9/00309 |
| | | | | 340/5.6 |
| 2013/0212661 | A1* | 8/2013 | Neafsey | G06F 21/45 |
| | | | | 726/6 |
| 2013/0335193 | A1* | 12/2013 | Hanson | H04W 12/06 |
| | | | | 340/5.61 |
| 2014/0051407 | A1* | 2/2014 | Ahearn | H04W 4/008 |
| | | | | 455/414.1 |
| 2015/0199863 | A1* | 7/2015 | Scoggins | G07C 9/00904 |
| | | | | 340/5.25 |
| 2015/0350913 | A1* | 12/2015 | Eberwine | H04W 12/08 |
| | | | | 455/411 |
| 2016/0180618 | A1* | 6/2016 | Ho | G07C 9/00563 |
| | | | | 340/5.52 |
| 2016/0358397 | A1* | 12/2016 | Kristensen | G07C 9/00309 |
| 2017/0243421 | A1* | 8/2017 | Ahearn | G07C 9/00309 |
| 2017/0269923 | A1* | 9/2017 | Coolidge | G06F 8/65 |
| 2017/0270731 | A1* | 9/2017 | Ribas | G07C 9/00817 |
| 2017/0311280 | A1* | 10/2017 | Skaaksrud | H04W 12/06 |

\* cited by examiner

DISTRIBUTED MANAGEMENT SYSTEM FOR SECURITY OF REMOTE ASSETS

CROSS-REFERENCE TO RELATED APPLICATIONS

This application claims the benefit of Indian Patent Application No. 4016/CHE/2015, filed Aug. 3, 2015.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The invention relates to a security system for securing assets. More particularly the invention relates to a Distributed management system for security of remote assets with elaborate process of authorization, supervision and managing of remote assets.

BACKGROUND OF THE INVENTION

In the past most ubiquitous technology i.e. 'Lock and Key' system through authorized access has been used for securing assets. Assets have been secured by the use of Locks and authorized access is given by placing complete trust on the person to whom a unique Key is provided that can open the Lock. Though the access may be for short duration under specific set of circumstances, handing over the key makes the asset vulnerable to access at all times and for whatever purposes. The problem is compounded when the Asset, whether moving or immobile is 'remote' and away from the owner's immediate supervision. There is no assurance to the owner that the lock has NOT been operated upon by someone else either legally with another duplicate key or tampered with illegally without leaving any evidence to show for it. Further if several persons have to be given access to the same asset and the same person has to access several assets, or both, there is a very complex management of keys, authorizations and records management. Invariably the breach of security occurs due to unscrupulous persons taking advantage of 'loopholes' in such a complex process.

In the prior art it is observed that an asset is secured with complex locks with/without keys, some have monitoring mechanisms that report the location of the asset as also status of the lock, others have processes for authenticating the key with passcodes comparisons. Thus it is paramount that the security of these assets is not only protected but a process and mechanism needs to be in place that gives the assurance that it is not breached and that security breaches will be detected immediately.

There is a need for the 'owner' to have the comprehensive status of all assets at any given time, whether secure, whether open, or by whom it was opened, whether moving on planned routes and so on. There also needs to be recorded history of all operations performed on the lock for analysis and reporting.

BRIEF SUMMARY OF THE INVENTION

The present invention discloses distributed management system for security of remote assets against unauthorized access while at the same time being very effective in providing timely, limited, appropriate access from a centralized control for predetermined purposes to authorized persons.

It is the primary object of this invention to provide an Asset Management System for security of remote assets for appropriate access from a centralized control for predetermined purposes to one or more authorized persons.

Another object of this invention is to provide an Asset Management System that provides high levels of security for widely distributed assets from a centralized control to secure the assets of the owners by themselves or through their authorized persons.

Another object of this invention is to provide an Asset Management System which manages assets which maybe static or mobile, small or big or may have simple rules or complex criteria that enable the access to the assets by authorized persons on the basis of pre-determined authorization.

Another object of this invention is to provide an Asset Management System that provides several authorized persons geographically located at different places to access assets which again maybe geographically distributed through the application of context based rules and criteria that determine the genuineness of the need.

Another object of this invention is to provide an Asset Management System that is flexible enough to operate effectively under different circumstances and available infrastructure by the design of various constituent elements that combine and interact seamlessly with one another on various known communication carriers and protocols such as GPRS, 3G, 4G, SMS, WIFI, Bluetooth, Near field, and CAN.

Another object of this invention is to provide an Asset Management System that detects attempts to breach physical or electronic or software aspects of security of the Asset Management System and immediately alerts the concerned persons responsible for the smooth operation of the System.

Another object of this invention is to provide the 'owners' or their authorized agents a comprehensive status of all 'owned' assets, whether static or mobile or located at any remote place, at any given time through the Asset Management System.

Another object of this invention is to provide an Asset Management System that is so flexible that there is no physical pairing of a 'Lock' and a 'Key' that operates it on one-on-one basis so that in principle any 'key' provided is authorized by the system can operate the 'Lock'.

Another object of this invention is to provide an Asset Management System that has one key that can potentially open several Locks or one Lock can be opened potentially by several keys in real time which reduces the cost of operations.

Another object of this invention is to provide an Asset Management System that directly interacts with the existing Software to provide seamless security to assets that are in transit or at a static location thereby creating a complete technology solution.

BRIEF DESCRIPTION OF THE SEVERAL VIEWS OF THE DRAWINGS

The objectives of the invention will be more readily understood by reference to the following detailed description, taken with reference to the accompanying drawings. Moreover, in the drawings, like reference numerals designate corresponding parts throughout the several views. In the drawings.

DETAILED DESCRIPTION OF THE ILLUSTRATED EMBODIMENTS

The present invention Distributed Management System provides for security of remote assets against unauthorized access while at the same time being very effective in providing timely, limited, appropriate access from a centralized control for predetermined purposes to authorized persons. Further, even authorized operations on the assets are monitored, recorded and captured for further analysis. The system with its various elements combine and interact with one another on various known communication carriers and protocols such as GPRS, 3G, 4G, SMS, WIFI, Bluetooth, near field, and CAN.

Figure 1:
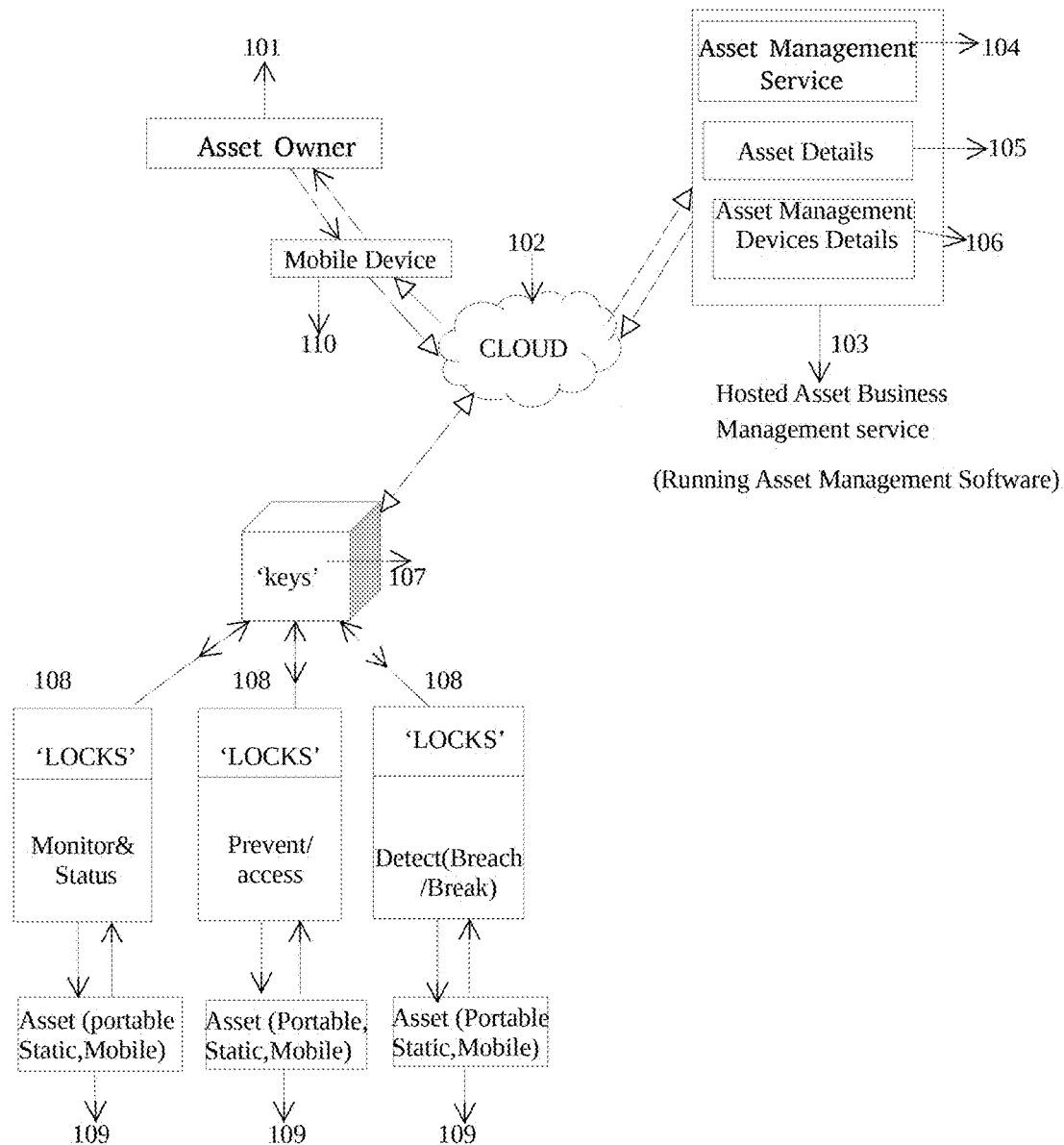
FIG. 1 shows the overview of the distributed management System that manages and provides the owners or authorized representatives, secure access to remote assets.

The present invention will be described in more detail hereinafter which relates to preferred embodiments of the invention explained with reference to the accompanying schematic drawings, in which:

FIG. 1 is an overview of the distributed asset management system configured to allow the asset owner 101 to manage or provide secure access to his/her remote static or mobile assets 109. The owner 101 could be an individual owner, owning a single asset 109 such as a vehicle or a house or a company owning multiple assets 109 spread across the globe.

The distributed asset management system typically consists of a hosted server 103 running an asset management service software application, on a cloud 102 through the internet. The asset management service software running on the server 103 primarily consists of modules which are asset management service module 104, asset details module 105 and asset management devices details module 106.

The database of the asset management service software in the server 103 stores the details 105 of the assets 109 to be managed and the devices that operate on the assets 109 to provide or deny access to the entry or use of the assets 109. The asset management service module 104 provides decisions for the management of assets based on a set of pre-defined business rules as provided by the asset owner 101.

Figure 2:
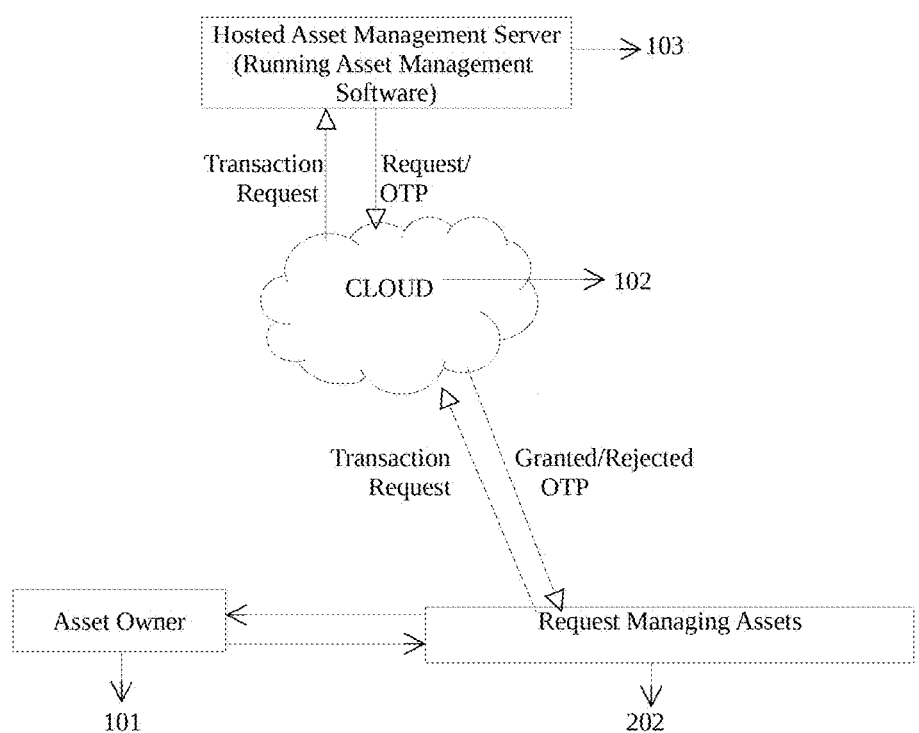
FIG. 2 illustrates the flow of interactions between the asset owner, requester and the server.

The details of the assets 109 are provided by the owner 101 and the asset management rules to be executed by the asset management service software in the server 103 for operations that are to be performed on the assets 109, are predefined or dynamically defined in real time by the owner 101. For example, the details of the assets 109 could include relevant data of cargo vehicles such as the GPS locations of places where loading/unloading of the cargo and locking/unlocking operations of the vehicles are allowed, the time when such operations can be carried out, the authorized persons who can perform the actions on the assets 109, the items that can be unloaded in each location, whether customer payment is mandatory before delivery and various other details of the assets 109 that are stored in the database of the server 103, pertaining to which the rules may also be already defined to enable performance of required operations on the assets 109. In short the server 103 can be configured with any set of context based rules against which the server 103 through asset management service software will decide dynamically to deny or accept a transaction request from the authorized representative called a requester 202 (FIG. 2).

The assets 109 that are to be managed could be mobile (e.g. a cargo vehicle) or static (e.g. a warehouse) or a portable asset (e.g. trunks containing diamonds or cash or jewelry boxes etc.). These assets 109 are managed by a single or a plurality of keys 107 and locks 108. The keys 107 and locks 108 together provide or deny access to the assets 109, or provide status of the assets 109 (e.g. location, or temperature), or provide alerts to the owner 101 when there is a breach, break-in or unauthorized misuse of the assets 109 (e.g. physical tampering, several attempts with incorrect password, etc.). In the preferred embodiment as described hereunder, the keys 107 are electronic keys and the locks 108 are electronic locks.

The owner 101 or the requester 202 has a mobile device 110 such as a smartphone or a laptop through which he/she communicates and interacts with the server 103. The owner 101 predefines the business processes in the server 103 through the asset management service software including the authorized access be given to an authorized user at the remote asset site or permissions to access when requested by an authorized user at the remote asset site. The owner through the server 103 continuously monitors the status of the lock 108. The server 103 alerts the owner 101 or the requester 202 whenever lock 108 is opened or locked and receives the data about lock operations stored in the lock. Further, the server 103 operates under the instructions of owner 101 or the requester 202 and communicates to the lock 108 to store any other information in the lock and display the stored information through the mobile device 110 to the owner 101 upon the request from the owner 101 or the requester 202. The owner 101 or the requester 202 can revoke authorization of any persons authorized previously.

The asset management service software running on the server 103 has inventory information of all the remote assets, information related to all elements of the distributed asset management system such as locks, keys, mobile device 110 related applications, etc, to be operated in the real time scenario. The asset management application software running on the server 103 has a set of predefined parameters like date, time, location of the asset, operational history of the asset, and compliance of business transaction information such as payment made, invoices raised, deliveries, orders etc accordingly customizes the security decisions while making real time decisions in allowing or denying access to the remote assets 109 to the owner 101 or the requester 202. The asset management application software customizes the security decisions for assets 109 based on the set of parameters like conditions, rules under which the assets 109 are to be operated, and the circumstances under which different persons are authorized to operate the remote assets 109.

The asset management application software maintains and provides real time information of all assets 109 and transaction history of all operations, persons performing the operations on all the assets located anywhere in the world to the owner 101. The asset management application software is customized as per the requirement of the owner 101. In real time scenarios, the asset management application software receives the information from the location of the asset 109 and decides to allow or deny access to any registered asset 109 situated anywhere in the world, to the owner 101 or an authorized user based on validation of the request by the predefined or dynamically defined rules in real time.

A mobile application is installed in the mobile device 110 by due authorization process by the server 103 and is operated by the authorized person who communicates with the asset management application software in the server 103. The mobile application dynamically generates specific identity through which the asset management application software authenticates the mobile application. Further, the mobile application is authorized to operate only on a set of keys 107 with specific identities on establishing and validating each other's identity, for performing operations on the lock 108 to secure the asset 109 for that specific transaction.

FIG. 2 shows an illustration of how the asset management service as shown in FIG. 1 is actually implemented or deployed. Typically the asset owner 101, who may also be a large company will have several managers responsible for secure operations of the assets 109 at various locations. In another scenario, if the asset owner 101 is an individual, he/she may also authorize a manager to manage his or her asset 109. These managers who are authorized by the owner are called requesters 202 as they will be requesting the server 103, though cloud 102 to provide them with the credentials for transactions such as 'lock', 'open' 'check status', etc., on the assets 109.

In case the asset owner 101 is an individual, the requester 202 instead of communicating with the server 103 to obtain authentication to manage the assets 109, could communicate directly to the owner 101 to obtain authentication to manage the assets 109. The requester's transaction request is sent to the owner 101 who communicates with the server 103 that performs checking of rules and carries out authentication process through asset management service software and communicates back the authorization/rejection to the owner 101 based on which the owner 101 responds with a reject denying the request or an authentication code such as an OTP for carrying out the request of the requester 202.

Figure 3:
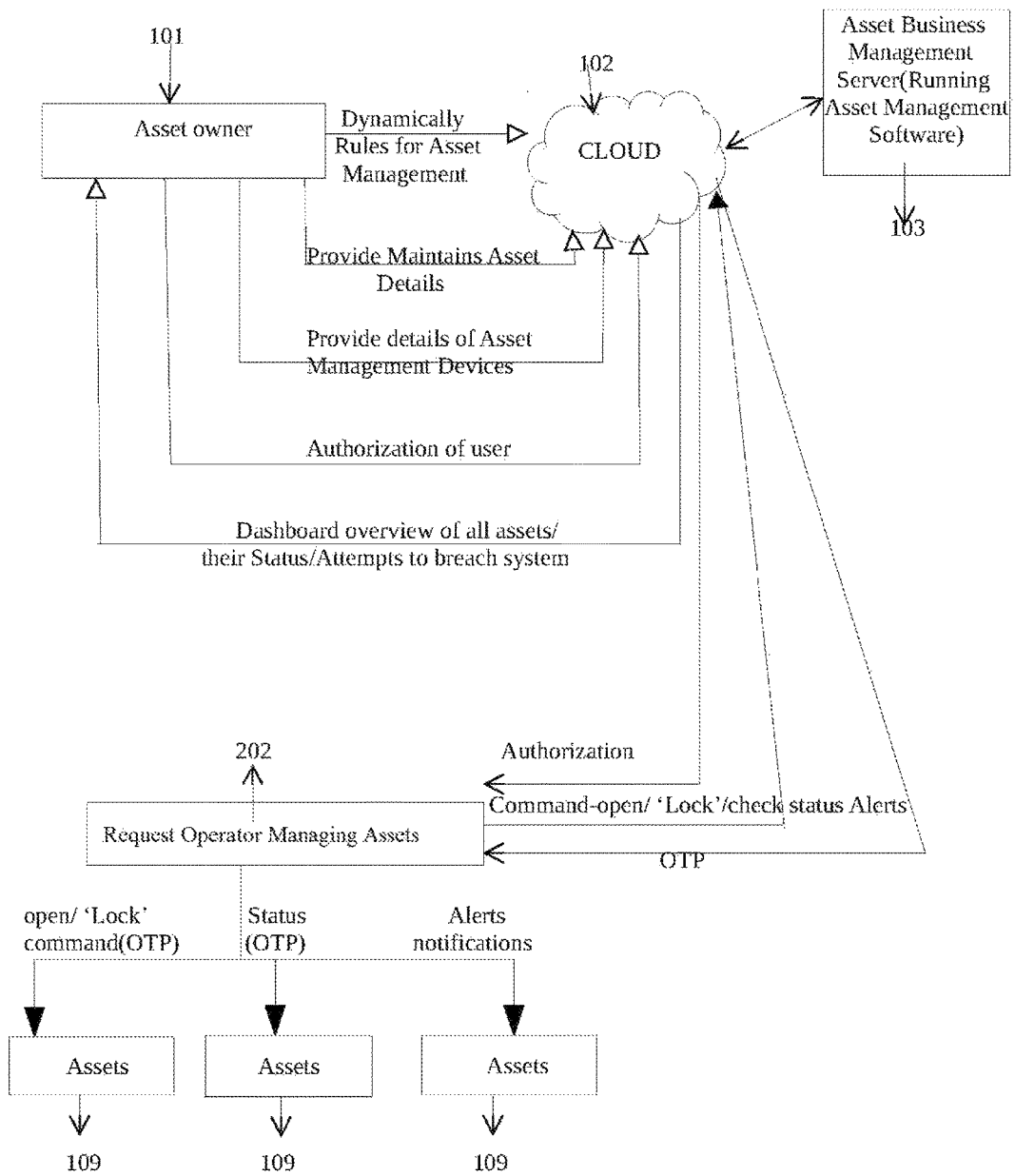
FIG. 3 illustrates the flow of interactions between the owner and the server and the interactions between the requester and the server that generates OTP for every transaction carried out by the requester.

FIG. 3 shows the owner 101 storing the asset 109 details in the server 103 through the cloud 102 and the requester 202 requesting the server 103 for authorization to perform a desired transaction on the asset 109. The transaction request is sent to the server 103 where the request is processed against asset management rules by the asset management service software, at the end of which the request can be turned down or the OTP (One time Passcode) for authentication is sent to the requester 202. The requester 202 uses the OTP for further operations on the asset 109 that is explained in subsequent figures. Unlike other systems, the server 103 is involved in every transaction requested by the authorized requester 202 or owner 101.

Figure 4:
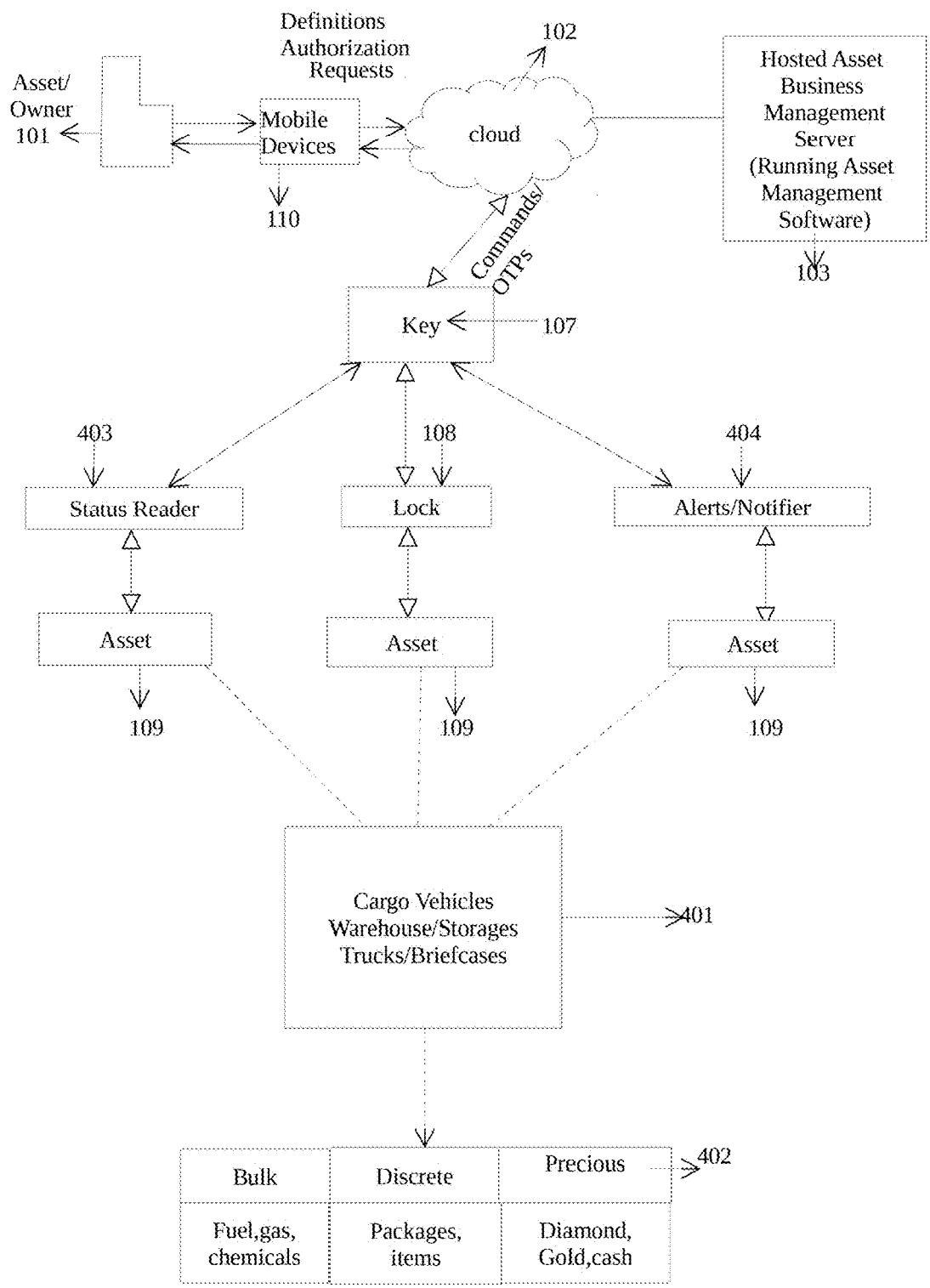
FIG. 4 illustrates in detail the transactions between the owner or requester and the assets through server authorized credentials.

FIG. 4 describes in detail the set-up of the distributed asset management system configured to enable the asset owner 101 or the requester 202, who could be an individual or Company to execute certain actions such as opening, locking, managing etc. of the assets 109 in their respective locations.

The asset owner 101 interacts with the Server 103 through the cloud 102 and inputs the details of all assets 109 that need to be managed. For example, where the assets 109 may be a fleet of cargo vehicles, then the details would be the vehicle details, the trip details of each vehicle, the exact locations of loading and unloading cargos of the vehicles, the particulars of the authorized persons responsible for managing the loading and unloading of vehicles etc. In case the asset 109 is a warehouse, then the details could be its location, particulars of various entry points to gain access, different storage locations of different items in the warehouse, different authorized personnel allowed entry to different areas within the warehouse that is the asset 109.

The owner 101 also provides details of the locks 108 that he/she has deployed in a particular location to protect each asset 109 to the server 103. For example, the details of the lock 107 comprises the type of the lock and the unique serial number of the lock used or fitted on the vehicle on its access points such as the door or the trunk of the vehicle. The owner 101 provides details of authorized requesters 202 who can operate on the lock, details of a set of keys along with their unique serial numbers that have been provided in the specific location to operate on the assets to the server 103.

The owner 101 also provides details of his/her mobile device 110 to retrieve an overview of the operations in real-time through a dashboard accessed from the server 103. The owner 101 thus can see the movement of the assets 109 such as vehicles, whether they are in transit, or being loaded or being unloaded, including the status of locks, whether locked or open, the log of operations performed along with the identity of the authorized person, timestamp, the operations carried out, the location where the operations were carried out etc. The owner 101 can also receive alerts and notifications from server 103 when unauthorized events occur.

The capturing and storing of all these details of the assets 109 in the server 103 help the owner 101 or the requester 202 to access these details and perform required transactions on the assets 109. In lieu of the owner 101, only authorized requesters 202 are allowed to raise transaction requests and the requests are acceded to by the server 103 through an OTP after checking against the pre-defined business rules. The requester 202 uses the OTP to perform operations on the key 107 or the lock 108 which perform operations to open or lock access to the Asset 109, or to check the status or to receive alerts and notifications about the security of the Asset 109.

Further operations of the key 107 and lock 108 are explained in subsequent drawings.

Figure 5:
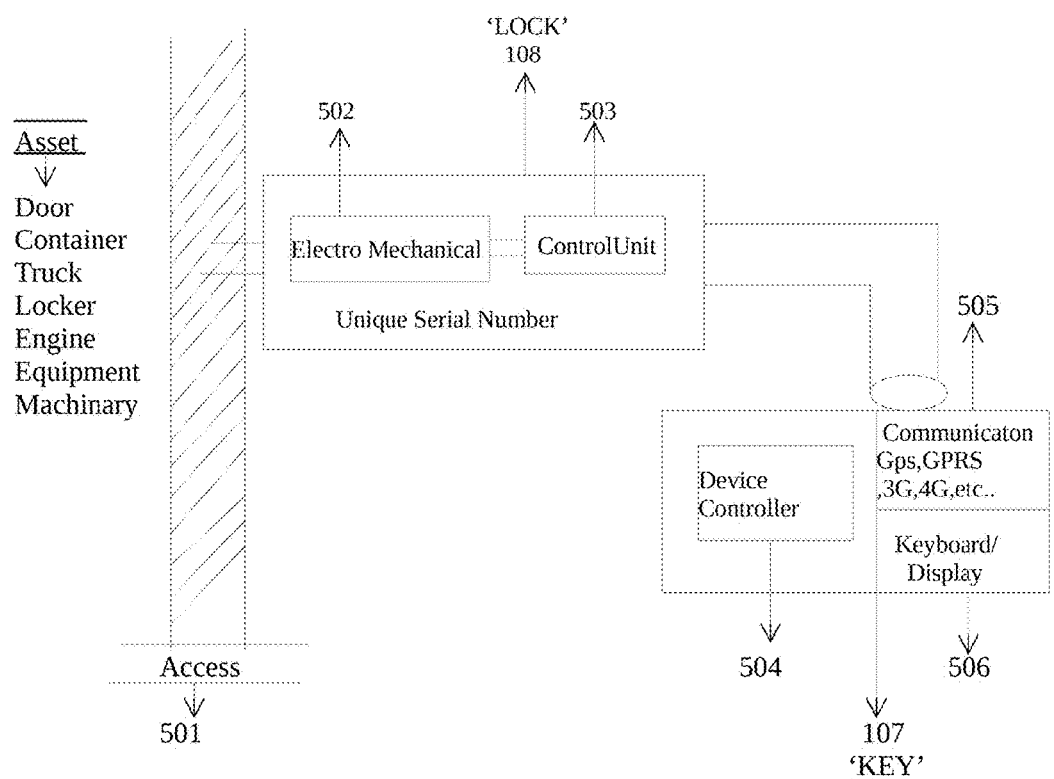
FIG. 5 illustrates the interactions between lock and key.

FIG. 5 elaborates the structure and functionalities of a single or plurality of the locks 107 and keys 108. The preferred embodiment of the electronic lock is an electro-mechanical device that secures the access to the asset 109. As explained in previous figures, the asset 109 could be static or mobile such as a tank carrying fuel or a container carrying cargo fitted on a vehicle, or a door to a storage area or an engine whose ignition lock needs to be controlled or an equipment whose use has to be restricted or a machinery whose running needs to be monitored or even a software that needs to be executed or stopped. Hence when we refer to a lock 107 its physical form could be of any design meant for that purpose. The important aspect is it prevents or provides access to enter into or to the use of an asset 109. The lock 108 may have two parts to it. One is an electro-mechanical unit 502 that is used for physical control to prevent or provide access into to the asset 109. It also consists of a control unit 503 that controls the actions of the electromechanical unit on one side and communicates with the key 108 on the other side. In certain scenarios, the lock 502 may not have electro-mechanical unit 502, if the purpose of the locking is to simply enable or disable the software from working.

In the preferred embodiment, where the key 107 is an electronic hand-held device, the key 107 has one part called device controller 504 which controls the lock by giving it commands such as lock, open, report status, etc. The commands can be further qualified by attributes such as time after when to 'Lock' or 'Open', the GPS or location co-ordinates within which to open the lock 108 etc. The other part of the lock 108 is a communicator 505. The communicator 505 communicates to the server 103 over the internet on the cloud 102 or using carriers such as GPRS, 3G, 4G, Short Messaging Service (SMS) or on a local network using Bluetooth, wifi, CAN. The key 107 also has a display device/keyboard 506 for the asset owner 101 or requester 202 to interact with the key 107. For example, the requester 202 can enter the OTP received from server 103 into the keyboard 506 and input commands to operate the Lock 108 or change passwords etc.

The key 107 has a unique Key identity number and through its own algorithm generates a real time passcode and verifies whether this matches with the OTP provided either directly by the server 103 or manually input by the requester 202 through the keyboard 506 (FIG. 5) of the key 107 that the requester 202 would have received on his registered mobile device 110 from the server 109. The mobile application which in turn either generates real time passcode itself or obtains it from the Server 109. Upon verification key 107 acknowledges authorization and is ready to accept commands from it for a particular transaction. The Key receives operational commands from the mobile application or through keyboard 506 (FIG. 5) like 'Lock', 'Open', 'Read data', 'Return status', etc. and the owner 101 or the requester 202 having the registered mobile device 110 with the mobile application performs those operations on the Lock 108. The key 107 is operated by a chargeable battery embedded within it and has its own location tracking capability through a standard GPS device embedded in it. The tracking capability of the key 107 enables the key 107 to perform operations even in the absence of the internet or Wifi or GPRS etc., and store its location, where a local rule is defined by the owner 101 thereby customizing the form factor of the key 107 and thus enabling the key 107 to access the lock 108 of the asset 109.

The lock 108 in certain embodiment, does bolting and securing the door of the asset 109, such as a warehouse, a truck, trunk, a cupboard, a locker or a vault, etc. The lock 108 can be located anywhere on or inside the door of the asset 108 and still perform all the functions described herein. The Lock can be of any shape and can be embodied as a bolt or a latch or a regular lock with a body and a U shaped bolt which can be slipped through a fixture and locked securely like a conventional lock. The Lock's mechanical assembly is sturdy and flameproof and adapted to secure any enclosed space or mechanism whose access could be a door, a gate, a container opening, a lever of a truck, a locker or any such device. The Lock has a unique identity. The Key and the Lock establish compatibility through an elaborate identity establishment process before any operations. The Lock generates dynamic code in real time in accordance to the authorization code provided by the Key and compatibility between Lock and Key is established in real time. The Key communicates the instructions of the owner 101 or the requester 202 to the Lock which interprets and carries out once the physical action of opening or closing the Lock like 'Lock', 'Open', 'Read data', 'Return status', etc. The Lock physically secures the asset with its locking mechanism and provides access to the asset 109 upon authorization. The Lock stores the transaction detail of all operations carried out by Key at any time and transmits continuously its information like geographical location to the owner 101 and displays the information to the requester 101 in the mobile device 110 upon the authorization of the owner 101.

Figure 6:
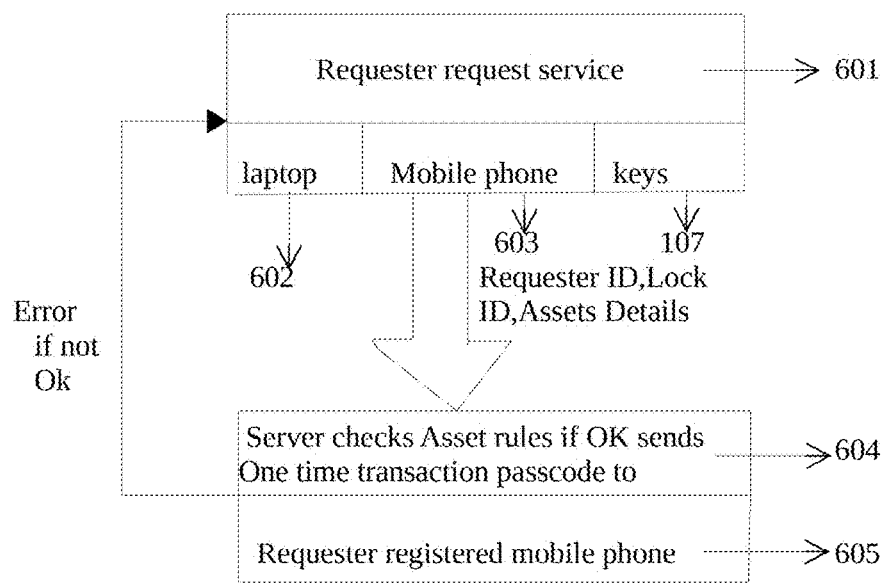
FIG. 6 illustrates the steps of obtaining one time password by the requester from the server through a registered mobile device of the owner.
Figure 7:
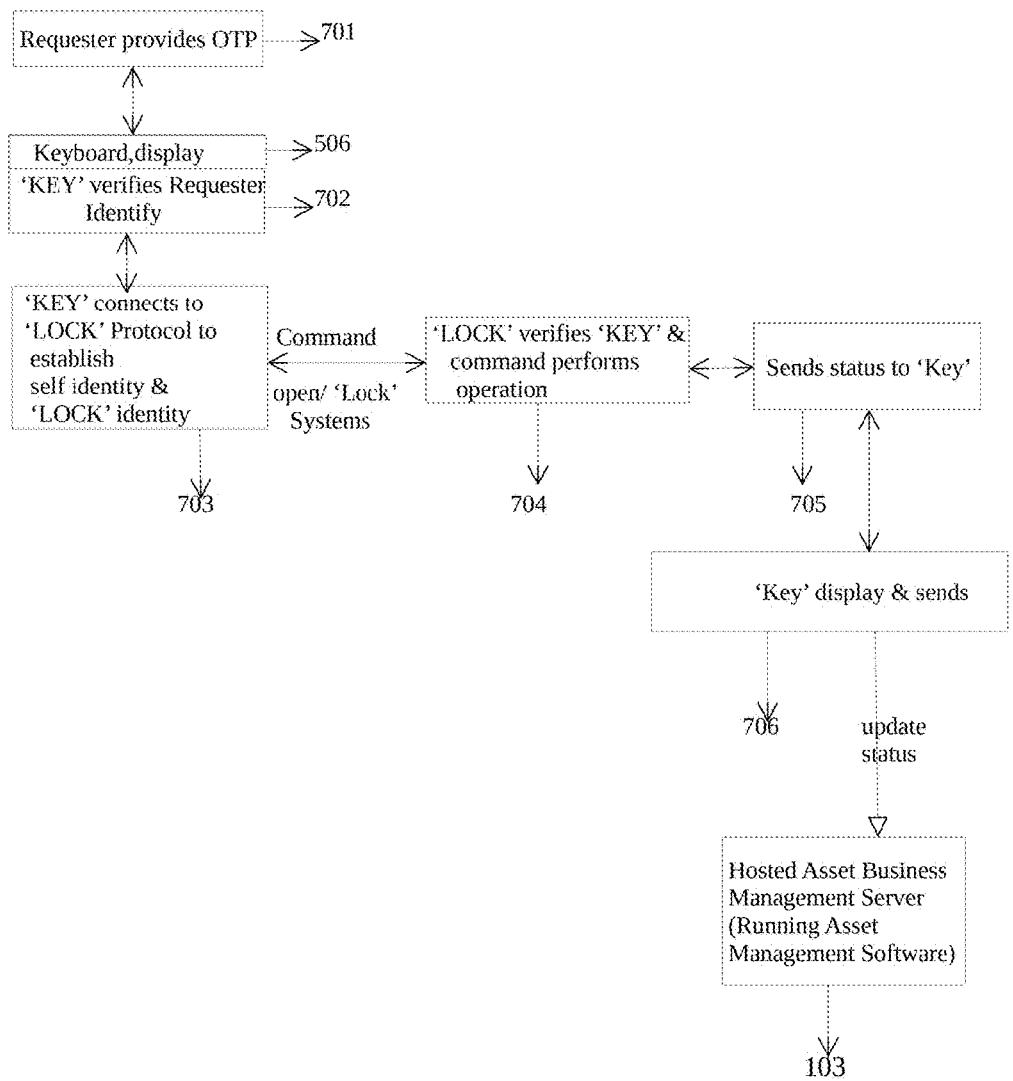
FIG. 7 illustrates the flow of pairing lock and key through credentials validated by the server, one time for that specific transaction.

FIG. 6 & FIG. 7 provide the flow for both these embodiments.

FIG. 6 shows a simplified flow diagram in which the requester 202 can request to perform the desired operation using the registered mobile device 110 such as laptop or mobile phone or the physical key device as described in FIG. 5. The flow describes the action taken by the requester 202, requesting the server 103 for an OTP to authorize him/her to access the asset 109. To obtain authorization to operate the key and the lock of the asset 109, the requester sends his login-id, his location, identity of the lock that needs to be operated, & asset details (e.g vehicle number etc.) to the server 103. The server 103 upon receiving the request from the requester 202 checks the request against the rules through the asset management service software and if the requester's 202 credentials are validated to be authentic, then the server 103 sends OTP to the requester's 202 registered mobile device 110.

FIG. 7 shows the simplified flow of use of lock & key for the operations of the assets 109 in different embodiments. In one embodiment the key either gets activated directly by the server 103 and in another embodiment the requester 202 activates the key 107 on inputting the OTP received from the server 103 as the key gets validated. If the requester 202 requires the server to directly access the key 107, the OTP is directly sent by the server 103 to the key 107 over the internet on the cloud 102. In either case, the 'Key' compares the OTP with an internally generated OTP. It is to be noted that OTPs are not stored either in the server 103 or in the key. Both the server 103 and the key 107 generate OTPs independently at the time of request by the requester 202. The OTP is generated at both ends by a proprietary algorithm. The algorithm run by asset management service software in the server 103 will be in synch to generate the same OTP as generated in the key 107. Once the OTP of the key 107 and the server 103 matches rest of the flow for both embodiments is similar. The key 107 connects to the lock 108 and exchanges identity information based on the proprietary protocol defined in the server 109. Once done, the key 107 sends credentials such as its unique serial number to lock 108 which performs the operation. Thus a DUPLICATED 'Key' or 'Lock' will not be able to establish mutual identity. Once operation is performed the status is sent to the 'Key' which displays the status in the mobile device 110 for the benefit of the requester 202 and also updates the status in the server 103.

The assets 109 could be Trucks, Tankers, Containers, Warehouses, High security restricted areas, campuses, homes, suitcases, lockers, vaults, prisons, high value equipment, etc. In scenarios such as a moving asset e.g. cargo on a vehicle, a single lock can be operated by several keys and mobile applications that function as keys located at various destinations along its route. These same keys and mobile applications can operate on several different locks fitted on to different vehicles passing through.

In some embodiments, the key 107 that may be an electronic device may also be 'plugged' or 'inserted' physically into a 'Key-hole' of the lock as in all lock and key arrangements. The locks 108 can be fitted inside or on the asset (e.g., vehicle) where convenient and feasible and the 'Key-hole' by the way of a connector can be extended by a cable over a long distance from the lock 108 that is electromechanical, so that the lock 108 can be secured by the owner 101 by inserting the key 107 in the 'Key-hole' from a more accessible location.

In other embodiments, wherein the asset 109 is an unmanned warehouse that is fitted with the Lock 108 on its main door can be operated by several requesters passing by the assets 109 through their own authorized keys 107. The same key could be used on several Locks within the warehouse. Also the physical location of the lock can be any place convenient as described above. Also all the locks within the asset 109 can be operated by a single key from a single panel where all key-holes could be provided for the ease of use of the asset owner 109 or the requester 202.

In case of multiple assets 109 such as a fleet of trucks or several warehouses across the country, the owner 101 or the requester 202 could monitor the security operations of the assets across various location from a single point. In high security offices and campuses, different personnel may be authorized differently for entry to specific areas and may be provided limited access at specific times and under specific circumstances. For example in an emergency, access may be provided to all exits.

In short any asset 109 that can be locked and access or use restricted can be secured and managed by this system. The distributed nature of the system comprising of simple elements described lends itself to all scenarios above irrespective of the nature, the size and the spread of the assets.

The above is a typical flow in a sample embodiment. However different variations are possible in different embodiment. For example, the Requester 202 could directly seek authorization from the owner 101.

In another embodiment, the lock 107 may also be a virtual lock in the form of a software which could be triggered by the key 107. The locks and keys may have abstract functionality of providing or denying access to the assets wherein the keys and locks may be electronic physical devices or virtual components that are authenticated through asset management service software in the server 103 to access the assets.

The Distributed management system can be integrated with the Enterprise software systems and other Enterprise technologies so as to provide a seamless technology solution wherein the assets are automatically locked, controlled and operated.

While the present invention has been described in connection with the preferred embodiments of the various figures, it is to be understood that other similar embodiments may be used or modifications or additions may be made to the described embodiment for performing the same function of the present invention without deviating there from. Therefore, the present invention should not be limited to any single embodiment, but rather construed in breadth and scope in accordance with the recitation of the appended claims.

We claim:

1. A distributed management system to manage and provide secure access to remote assets to an asset owner, comprising:
    a hosted business management server running an asset management service software for monitoring and managing a plurality of an owner's remote assets;
    an authorized mobile device comprising a mobile application authenticated and installed by a due authorization process of the asset management service software through which the owner communicates with the server to access and manage the remote assets;
    a key that secures the assets that is connected to the server and accessed by the owner wherein the key is an electronic device; and
    a lock securing access to the assets and the key providing access to the assets through the server wherein the key receives operational commands from the server for each transaction through the mobile application and the owner performs operations on the lock which interprets and carries out a physical action of opening or closing the lock on the remote assets wherein the lock is an electronic device.

2. The distributed management system of claim 1, wherein the owner predefines or dynamically defines a set of rules customizing security decisions of the assets in the asset management service software to authenticate every transaction, between the lock and the key, of the assets at various remote locations.

3. The distributed management system of claim 1, wherein the owner communicates to the server a request for the key to access the lock on the asset, wherein the asset management service software through the rules authenticates the mobile application and authorizes the mobile application to operate on the key for performing a particular operation on the lock to secure or manage the asset.

4. The distributed management system of claim 1, wherein the hosted business management server continuously receives transaction history of the locks and monitors a status of all locks of the assets and alerts the asset owner and communicates instructions of the owner to the lock, or is capable of directly and automatically commanding the lock to open or lock the asset that may be remotely located, depending on a set of rules defined by the owner for a particular operation of that lock.

5. The distributed management system of claim 1, wherein the asset management service software running on the server customizes security decisions for a single or for a plurality of the remote assets based on the set of parameters under which the assets are to be operated, and circumstances under which different requesters, as authorized by the owner, to operate the remote assets, wherein credentials such as a one-time password (OTP) are generated by the server to access the asset, where the one-time password (OTP) can be used only once by the owner or requester.

6. The distributed management system of claim 1, wherein the asset management service software maintains and provides real time information of all assets to the owner and stores transaction history of all operations on all assets that may be mobile, static or portable, the assets located remotely or within vicinity of the owner.

7. The distributed management system of claim 1, wherein the mobile application dynamically generates a unique identity and is authorized to generate credentials when the key requests to operate the lock and the requester allows the mobile device to send credentials to the key to operate the lock on the asset, thereby bypassing the server altogether.

8. The distributed management system of claim 1, wherein the key has a unique Key identity number, receives operational commands from the mobile application through which the owner performs operational commands on the lock, or the key obtains a one-time password (OTP) directly from the server every time the lock has to be operated.

9. The distributed management system of claim 1, wherein lock has a unique identity, where the key and the lock establish compatibility through an identity establishment process wherein the key communicates instructions of the owner to the lock which interprets and carries out a physical action of opening or closing of a door of the asset and a status of the lock can be accessed at any time from any location by the server or the owner or the requester.

* * * * *